(12) United States Patent  
Park

(10) Patent No.: US 8,399,132 B2  
(45) Date of Patent: Mar. 19, 2013

(54) NIOBIUM OXIDE-CONTAINING ELECTRODE AND LITHIUM BATTERY INCLUDING THE SAME

(75) Inventor: Joung-wok Park, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 992 days.

(21) Appl. No.: 12/196,519

(22) Filed: Aug. 22, 2008

(65) Prior Publication Data

US 2009/0214958 A1    Aug. 27, 2009

(30) Foreign Application Priority Data

Feb. 26, 2008    (KR) .................. 10-2008-0017420

(51) Int. Cl.  
    *H01M 4/62*    (2006.01)

(52) U.S. Cl. .................. 429/232; 429/218.1; 429/231.8; 429/231.9; 429/231.95; 252/182.1

(58) Field of Classification Search .................. None  
See application file for complete search history.

(56) References Cited

U.S. PATENT DOCUMENTS

| | | | | |
|---|---|---|---|---|
| 5,401,599 A | * | 3/1995 | Tahara et al. .................. | 429/338 |
| 5,443,930 A | * | 8/1995 | Shoji et al. .................... | 429/224 |
| 6,063,142 A | * | 5/2000 | Kawakami et al. ............ | 29/623.5 |
| 2002/0172865 A1 | * | 11/2002 | Che et al. ...................... | 429/231.1 |

* cited by examiner

*Primary Examiner* — Ula C Ruddock  
*Assistant Examiner* — Tony Chuo  
(74) *Attorney, Agent, or Firm* — Christie, Parker & Hale, LLP

(57) ABSTRACT

A niobium oxide-containing electrode includes a collector; and an active material layer formed on the collector, the active material layer including an active material, a conducting agent and a binder; and niobium oxide on the active material layer on the collector.

11 Claims, 2 Drawing Sheets

COLLECTOR

ACTIVE MATERIAL LAYER

CONDUCTING AGENT

NIOBIUM OXIDE COATING

COLLECTOR  ACTIVE MATERIAL LAYER

CONDUCTING AGENT

NIOBIUM OXIDE COATING

NIOBIUM OXIDE-CONTAINING ELECTRODE AND LITHIUM BATTERY INCLUDING THE SAME

CROSS-REFERENCE TO RELATED PATENT APPLICATION

This application claims the benefit of Korean Patent Application No. 2008-17420, filed on Feb. 26, 2008, in the Korean Intellectual Property Office, the disclosure of which is incorporated herein in its entirety by reference.

BACKGROUND OF THE INVENTION

1. Field of the Invention

Aspects of the present invention relate to a niobium oxide-containing electrode and a lithium battery including the niobium oxide-containing electrode. More particularly, aspects of the present invention relate to a niobium oxide-containing electrode that has a high capacity and high-rate characteristics due to niobium oxide and a lithium battery including the niobium oxide-containing electrode.

2. Description of the Related Art

Conventionally, metallic lithium is used as an anode active material in lithium batteries. However, when metallic lithium is used, dendrites may be formed inside the batteries, which can lead to short-circuits or battery explosion. To prevent these problems, carbonaceous material-containing anode active materials have been used instead of metallic lithium. Therefore, various kinds of carbonaceous material-containing anode active materials have been developed.

Many electronic devices, such as phones, digital cameras, and notebook computers, are manufactured as portable, wireless devices. Accordingly, demands for light-weight, small, and high energy density secondary batteries used as operating power sources have increased. Specifically research on non-aqueous electrolytic lithium batteries including a lithium-containing metal oxide having a voltage of 4V as a cathode active material and an anode active material capable of adsorbing or releasing lithium is being conducted to obtain a high voltage and high energy density battery.

However, no conventional active material has satisfied all requirements for use in lithium batteries. For example, an inexpensive and stable active material may have low conductivity, low capacity, and low energy density; and a highly conductive active material may have a complicated and expensive preparation process.

Therefore, disadvantages of respective active materials should be addressed.

For example, $Li_4Ti_5O_{12}$ is inexpensive and stable and is easily prepared. However, $Li_4Ti_5O_{12}$ has low conductivity, and thus, has low initial efficiency and low capacity and energy density per volume. To address this problem, $Li_4Ti_5O_{12}$ can be formed into nano-sized particles or in a form of a semi-conductive carbon complex, or $Li^+$ or $Ti^{4+}$ can be substituted with an metallic ion having a high oxidation number, such as $V^{5+}$, $Mn^{4+}$, $Fe^{3+}$, $Ni^{2+}$, $Cr^{3+}$ or $Mg^{2+}$.

However, there is still a desire to develop an active material having sufficient conductivity and an electrode including the active material.

SUMMARY OF THE INVENTION

Aspects of the present invention provide a niobium oxide-containing electrode having improved initial efficiency and cyclic characteristics.

Aspects of the present invention also provide a lithium battery including the niobium oxide-containing electrode.

According to an embodiment of the present invention, there is provided an electrode comprising a collector and an active material layer formed on the collector, the active material layer comprising an active material, a conducting agent and a binder, and the electrode further comprising niobium oxide on the active material layer on the collector.

According to an aspect of the present invention, the niobium oxide is represented by $NbO_y$ where $1 \leq y \leq 2.5$.

According to an aspect of the present invention, a surface of the active material layer is surface-treated with the niobium oxide.

According to an aspect of the present invention, the amount of niobium oxide is in a range of 0.01 to 5% by weight based on 100% by weight of the active material.

According to an aspect of the present invention, the active material comprises at least one material selected from the group consisting of a lithium-containing metal oxide, metallic lithium, a lithium alloy, a carbonaceous material, and graphite.

According to an aspect of the present invention, the active material is $Li_4Ti_5O_{12}$, $LiMPO_4$, where M denotes Fe or Mn, or $LiMn_2O_4$.

According to an aspect of the present invention, the conducting agent is carbon black.

According to an aspect of the present invention, the binder comprises at least one material selected from the group consisting of a vinylidenefluoride/hexafluoropropylene copolymer, polyvinylidenefluoride, polyacrylonitrile, polymethylmethacrylate, polytetrafluoroethylene, a mixture thereof, and a styrene butadiene rubber-based polymer.

According to another embodiment of the present invention, there is provided a lithium battery comprising: a cathode; an anode; and an organic electrolyte, wherein at least one of the cathode and the anode is the niobium oxide-containing electrode described above.

According to an aspect of the present invention, the organic electrolyte comprises a lithium salt and a non-aqueous organic solvent.

According to an aspect of the present invention, the non-aqueous organic solvent is a solvent mixture of a solvent having a high dielectric constant and a solvent having a low boiling point.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
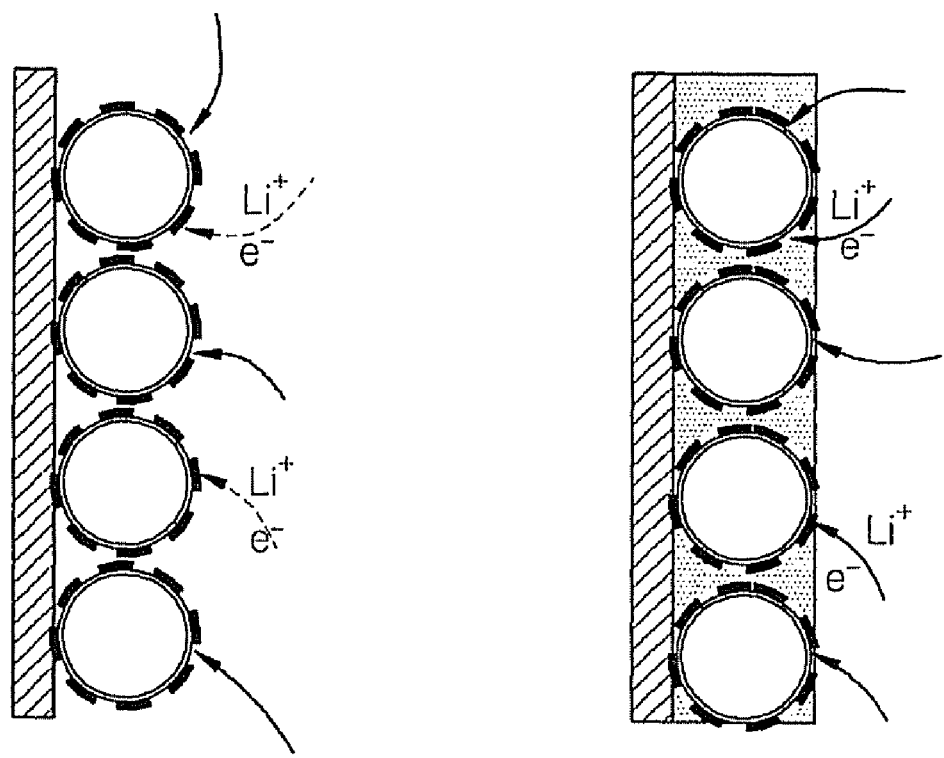
FIG. 1 is a schematic view illustrating the flow of lithium ions in a conventional electrode and in a niobium oxide-containing electrode according to an embodiment of the present invention.
Figure 1:
Figure 1:
Figure 1:
Figure 1:

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Herein, it is to be understood that where is stated herein that one layer is "formed on" or "disposed on" a second layer, the first layer may be formed or disposed directly on the second layer or there may be intervening layers between the first layer and the second layer. Further, as used herein, the term "formed on" is used with the same meaning as "located on" or "disposed on" and is not meant to be limiting regarding any particular fabrication process.

According to aspects of the present invention, niobium oxide is introduced onto a surface of an electrode so as to compensate for low conductivity of an active material. Therefore, electrical characteristics of the electrode, such as, for example, capacity, high-rate characteristics, and initial efficiency are improved.

A niobium oxide-containing electrode according to aspects of the present invention is obtained by surface-treating an electrode including an active material, a conducting agent, and a binder with niobium oxide having high electric conductivity. Therefore, even when the active material has low conductivity, a decrease in the capacity of the electrode can be reduced and the initial capacity of the electrode can be improved, because niobium oxide enhances the intercalation and deintercalation of lithium ions and thus, lithium ions easily flow and are easily stored during charging and discharging. Therefore, the initial efficiency and cyclic characteristics of the electrode can be improved by surface-treated the electrode with niobium oxide.

Specifically, the left side of FIG. 1 depicts an electrode that is not coated with niobium oxide and in which carbon black acting as the conducting agent is coated on part of a surface of the active material. The areas of the electrode in which the conducting agent is not present have low electronic conductivity and low ionic conductivity. Thus, it is difficult for electrons or lithium ions to penetrate the active material. In contrast, the right side of FIG. 1 depicts an anode that is surface-treated with niobium oxide by coating niobium oxide on the anode. Electrons and lithium ions easily flow into the active material having a lattice structure even through a portion of the surface of the active material on which the conducting agent is not coated and are stored therein. As a result, the initial efficiency and cyclic characteristics of the niobium oxide-containing electrode are improved.

The niobium oxide-containing electrode according to aspects of the present invention is formed by coating an electrode with niobium oxide, thereby enhancing the intercalation or deintercalation of lithium ions. A niobium oxide surface coating layer makes a surface of the niobium oxide-containing electrode more uniform.

The electrode to be surface-treated with niobium oxide includes a collector and an active material layer formed on the collector. The active material layer includes an active material, a conducting agent, and a binder. The niobium oxide may be represented by $NbO_y$, where $1 \leq y \leq 2.5$. The niobium oxide may be directly coated onto a surface of the electrode. Alternatively, a precursor solution prepared by dissolving niobium chloride or niobium alkoxide with an organic solvent, such as alcohol, can be applied to the surface of the electrode, dried in air at room temperature, and then dried and oxidized using an ultraviolet-ray treatment, thereby forming the niobium oxide on the surface of the electrode.

The coating of the electrode with niobium oxide may be performed after the active material layer is formed on the collector, so that a sufficient amount of the niobium oxide is positioned among the respective elements forming the active material layer.

The thickness or content of the niobium oxide surface coating layer depends upon the concentration of a niobium oxide surface coating solution used to form the coating layer. When the niobium oxide surface coating layer is thick or the amount of niobium oxide in the niobium oxide surface coating layer is large, the niobium oxide surface coating layer may have a low conductivity and thus poor high-rate characteristics. Therefore, the thickness or content of the niobium oxide surface coating layer should be appropriately selected according to the characteristics of a target lithium battery. The amount of niobium oxide in the surface coating layer may be determined such that the amount of niobium is in a range of about 0.01 to 5% by weight based on 100% by weight of the active material, or more specifically in a range of 0.6 to 2% by weight. When the amount of niobium oxide is less than 0.01% by weight based on 100% by weight of the active material, it may be difficult to obtain desired effects. On the other hand, when the amount of niobium oxide is more than 5% by weight of the active material, high-rate characteristics may be degraded. The thickness of the niobium oxide surface coating layer according to the content condition described above may be in a range of 1 to 100 nm.

As described above, the niobium oxide-containing electrode according to aspects of the present invention includes an active material layer formed on a collector. The active material may be any active material that is used in the art. For example, the active material may include at least one selected from the group consisting of a lithium-containing metal oxide, metallic lithium, a lithium alloy, a carbonaceous material, and graphite. For example, the active material may be $Li_4Ti_5O_{12}$, $LiMPO_4$, where M denotes Fe or Mn, or $LiMn_2O_4$.

The niobium oxide-containing electrode can be any type of electrode. For example, the niobium oxide-containing electrode may be a cathode or an anode.

When the niobium oxide-containing electrode is an anode, a collector included in the anode may be a copper collector, a nickel collector, or a SUS collector, or more specifically, a copper collector.

To form an anode active material layer on the collector, an anode active material composition is prepared by mixing an anode active material, a conducting agent, a binder and a solvent. Then, the anode active material composition is directly coated onto the collector. Alternatively, the anode active material composition may be cast onto a support to form an anode active material film, which is then exfoliated from the support and laminated on the collector, thereby obtaining an anode plate. In either case, niobium oxide is then coated onto the obtained anode plate to manufacture a niobium oxide-containing anode.

The anode active material may be as described above. For example, the anode active material may be $LiMPO_4$, where M denotes Fe or Mn, $Li_4Ti_5O_{12}$, metallic lithium, a lithium alloy, carbonaceous material, or graphite.

The conducting agent used to form the anode active material layer may be carbon black or the like. The binder used to form the anode active material layer may be a vinylidenefluoride/hexafluoropropylene copolymer, polyvinylidenefluoride, polyacrylonitrile, polymethylmethacrylate, polytetrafluoroethylene, a mixture thereof, a styrene butadiene rubber-based polymer, or the like. The solvent may be N-methylpyrrolidone, acetone, water, or the like.

When the niobium oxide-containing electrode is a cathode, a cathode active material composition is prepared by mixing a cathode active material, a conducting agent, a binder, and a solvent, similar to the method of manufacturing the anode plate as described above. The cathode active material composition is directly coated onto an aluminum collector and dried to manufacture a cathode plate. Alternatively, the cathode active material composition may be cast onto a support to form a film, which is then exfoliated from the support and laminated on the aluminum collector to manufacture a cathode plate. In either case, niobium oxide is then coated onto the obtained cathode plate to manufacture a niobium oxide-containing cathode.

The cathode active material may be any lithium-containing metal oxide that is used in the art. For example, the cathode active material may be $LiMPO_4$ where M denotes Fe or Mn, $LiCoO_2$, $LiMn_xO_{2x}$, $LiNi_{x-1}Mn_xO_{2x}$ where x=1 or 2, or $LiNi_{1-x-y}Co_xMn_yO_2$ where $0 \leq x \leq 0.5$ and $0 \leq y \leq 0.5$. In the cathode active material composition, the conducting agent, the binder, and the binder may be the same as the conducting agent, the binder, and the binder described above with reference to the anode plate. In this regard, the amount of the cathode active material, the conducting agent, the binder and the solvent may be the same as in a conventional lithium battery.

If desired, a plasticizer may be further added to the cathode active material composition and the anode active material composition in order to form pores in the anode plate or the cathode plate.

A separator may be interposed between a cathode and an anode. The separator can be any separator that is commonly used in a lithium battery. Specifically, a separator having low resistance to ion mobility and an excellent electrolyte retaining property is desirable. Examples of the separator include glass fiber, polyester, TEFLON, polyethylene, polypropylene, polytetrafluoroethylene (PTFE), or a combination thereof, each of which can be a nonwoven fabric or a woven fabric. For example, a lithium ion battery typically uses a foldable separator formed of polyethylene or polypropylene, and a lithium ion polymer battery typically uses a separator having an excellent organic electrolyte retaining capability.

To manufacture the separator, a polymer resin, a filler, and a solvent are mixed to prepare a separator composition. Then, the separator composition may be directly coated onto an electrode, and then dried to form a separator film. Alternatively, the separator composition may be cast on a support and then dried to form a separator composition film, which is then exfoliated from the support and laminated on an electrode, thereby completing the manufacture of a separator.

The polymer resin can be any material that is used as a binder of an electrode plate. For example, the polymer resin may be a vinylidene fluoride/hexafluoropropylene copolymer, polyvinylidenefluoride, polyacrylonitrile, polymethylmethacrylate, a mixture thereof, or the like. Specifically, the polymer resin may be a vinylidene fluoride/hexafluoropropylene copolymer in which the content of the hexafluoropropylene is in a range of 8 to 25% by weight.

As described above, the separator is sandwiched between the cathode plate and the anode plate to form an electrode assembly. The electrode assembly may be wound or folded such that it can be placed in a spherical battery case or a rectangular battery case, and then an organic electrolyte is injected thereto, thereby completing the manufacture of a lithium ion battery. A plurality of electrode assemblies may be stacked in a bi-cell structure, and then dipped in an organic electrolyte. The obtained structure is placed in a pouch and sealed to completely manufacture a lithium ion polymer battery. It is to be understood that other structures for a lithium battery may be used.

The organic electrolyte includes a lithium salt and a non-aqueous organic solvent. The non-aqueous organic solvent acts as a medium in which ions from an electrochemical reaction of a battery flow. For example, the non-aqueous organic solvent may be an organic solvent mixture of a solvent having a high dielectric constant and a solvent having a low boiling point. The solvent having a high dielectric constant and the solvent having a low boiling point may be mixed in a mixture volume ratio of 1:1 to 1:9. When the mixture volume ratio is outside the range, a discharge capacity and a charging and discharging lifetime may be decreased.

The non-aqueous organic solvent may include at least one kind of material selected from the group consisting of a cyclic carbonate, a non-cyclic carbonate, an aliphatic carboxylic ester, a non-cyclic ether, a cyclic ether, an alkyl phosphoric ester, a gamma-lactone and fluorides thereof. Specifically, the non-aqueous solvent may include at least one material selected from the group consisting of cyclic carbonate, non-cyclic carbonate, and aliphatic carboxylic ester.

The cyclic carbonate, the cyclic ether, the alkyl phosphoric ester, and the non-cyclic ether are solvents having a high dielectric constant, and the non-cyclic carbonate and the aliphatic carboxylic ester are solvents having a low boiling point.

As non-limiting examples, the cyclic carbonate may be ethylene carbonate, propylene carbonate, butylene carbonate, or vinylene carbonate. The non-cyclic carbonate may be dimethyl carbonate, diethyl carbonate, ethyl methyl carbonate, methyl propyl carbonate, ethyl propyl carbonate, dipropyl carbonate, or methyl ethyl carbonate. The aliphatic carboxylic ester may be methyl formate, methyl acetate, methyl propionate, or ethyl propionate.

The non-cyclic ether may be 1,2-dimethoxyethane, 1,2-diethoxyethane, or ethoxymethoxyethane. The cyclic ether may be tetrahydrofurane or 2-methyltetrahydrofurane. The alkyl phosphoric ester may be dimethylsulfoxide, 1,2-dioxolane, trimethyl phosphate, triethyl phosphate or trioctyl phosphate.

The lithium salt included in the organic electrolyte acts as a lithium ion supplier in a lithium battery and operates the lithium battery. The lithium salt may include at least one lithium salt selected from the group consisting of $LiPF_6$, $LiBF_4$, $LiAsF_6$, $LiClO_4$, $LiCF_3SO_3$, $LiSbF_6$, $CF_3SO_3Li$, $LiN(SO_2CF_3)_2$, $LiC_4F_3SO_3$, $LiAlF_4$, $LiAlCl_4$, $LiN(SO_2C_2F_5)_2$, $LiN(C_xF_{2x+1}SO_2)(C_yF_{2+y}SO_2)$ where x and y are natural numbers, LiCl, and LiI. However, the lithium salt is not limited to materials described above.

In the organic electrolyte, the concentration of the lithium salt may be in a range of 0.5 to 2M. When the concentration of the lithium salt is less than 0.5M, the organic electrolyte may have low conductivity and the performance of the organic electrolyte may be degraded. On the other hand, when the concentration of the lithium salt is higher than 2.0M, the viscosity of the organic electrolyte is increased and the mobility of lithium ions may be decreased.

Figure 2:
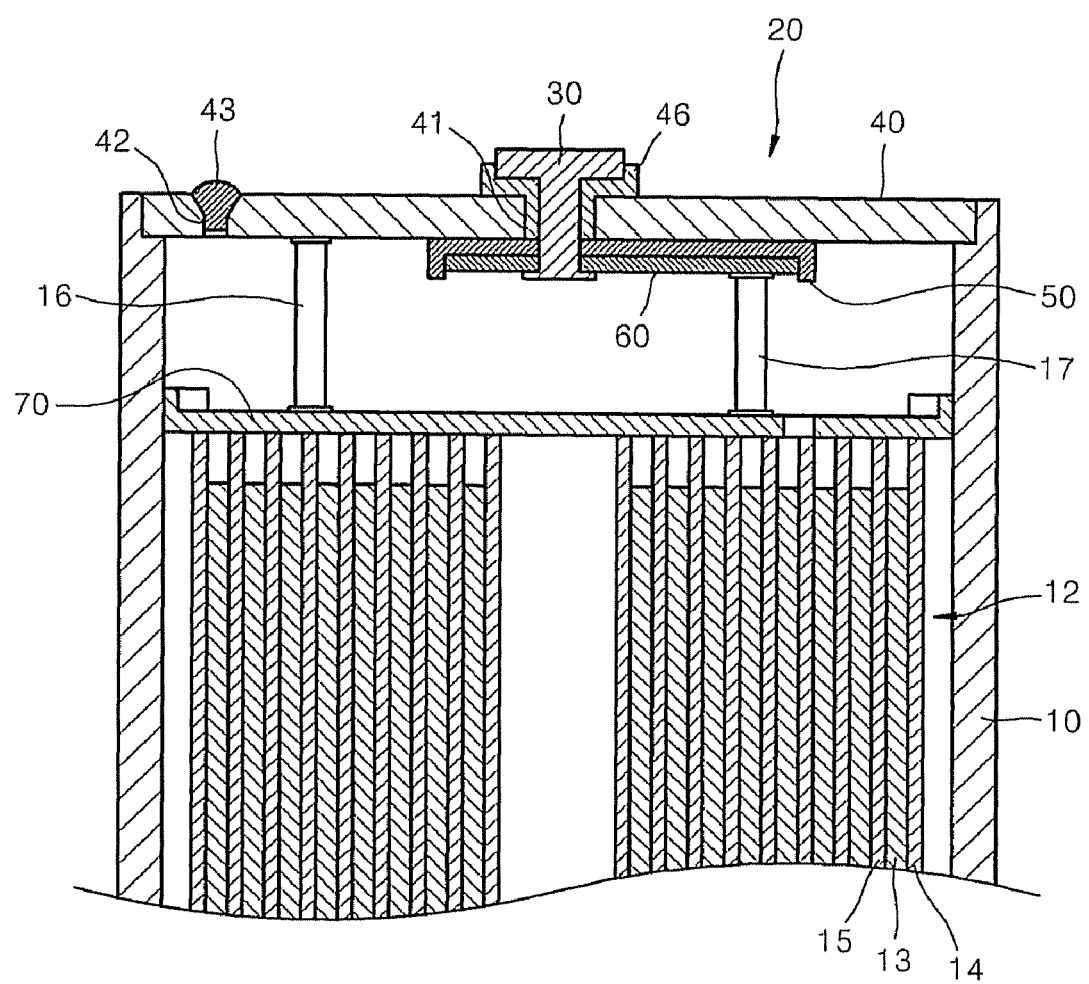
FIG. 2 is a schematic view of a lithium battery according to an embodiment of the present invention.

An example of a lithium battery having the structure described above is illustrated in FIG. 2. Referring to FIG. 2, the lithium battery includes an electrode assembly 12 including a cathode 14, an anode 15, and a separator 13 between the cathode 14 and the anode 15. The electrode assembly 12 is placed in a can 10 together with an electrolyte, and a top portion of the can 10 is sealed with a cap assembly 20. The cap assembly 20 includes a cap plate 40, an insulating plate 50, a terminal plate 60, and an electrode terminal 30. The cap assembly 20 is combined with an insulating case 70 and seals the can 10.

The cap plate 40 has a terminal through-hole 41 in a central portion. The electrode terminal 30 is inserted through the terminal through-hole 41. Before the electrode terminal 30 is inserted through the terminal through-hole 41, the electrode terminal 30 is combined with a tube-type gasket 46 on an outer surface of the electrode terminal 30 to insulate the electrode terminal 30 from the cap plate 40 and then the combination structure of the electrode terminal 30 and the cap plate 40 is inserted into the terminal through-hole 41. When the cap assembly 20 is assembled in the top portion of the cap 10, an electrolyte is injected through an electrolyte injection hole 42 and the electrolyte injection hole 42 is sealed with a cap 43. The electrode terminal 30 is connected with an anode tap 17 of the anode 15 or a cathode tap 16 of the 14 and acts as an anode terminal or a cathode terminal or a cathode terminal.

Aspects of the present invention will be described in further detail with reference to the following examples. These examples are for illustrative purposes only and are not intended to limit the scope of the present invention.

COMPARATIVE EXAMPLE 1

8.2 g of $Li_4Ti_5O_{12}$ powder having a particle size of several nm to 3 μm, 1 g of graphite powder, and 8 g of 10% by weight of PVDF solution (solvent: N-methylpyrrolidone) were mixed and the mixture was stirred using a mechanical stirrer to obtain a slurry. The slurry was coated to a thickness of about 60 μm onto a copper collector with a size suitable for a 2016-type battery using a doctor blade, and then the coated slurry was dried. The resultant slurry was dried under vacuum at 120° C. Thereby, an anode plate was manufactured.

COMPARATIVE EXAMPLE 2

8.2 g of $Li_4Ti_5O_{12}$ powder having a particle size of several nm to 300 nm, 1 g of graphite powder, and 8 g of 10% by weight of PVDF solution (solvent: N-methylpyrrolidone) were mixed and the mixture was stirred using a mechanical stirrer to obtain a slurry. The slurry was coated to a thickness of about 60 μm onto a copper collector with a size suitable for a 2016-type battery using a doctor blade, and then the coated slurry was dried. The resultant slurry was dried under vacuum at 120° C. Thereby, an anode plate was manufactured.

EXAMPLE 1

0.05 ml of a 20 mM $NbCl_5$ solution prepared by dissolving $NbCl_5$ with ethanol was applied to a surface of an anode plate that was prepared according to Comparative Example 1. The resultant anode plate was treated with ultraviolet (UV) light for 1 minute. Then, the treated anode plate was dried at 120° C. for 2 hours to remove moisture absorbed during the UV treatment process, thereby obtaining a niobium oxide-containing anode.

EXAMPLE 2

0.05 ml of a 20 mM $NbCl_5$ solution prepared by dissolving $NbCl_5$ with ethanol was applied to a surface of an anode plate that was prepared according to Comparative Example 1. The resultant anode plate was treated with ultraviolet (UV) light for 1 minute. Then, the treated anode plate was dried at 120° C. for 2 hours to remove moisture absorbed during the UV treatment process. The application of the $NbCl_5$ solution and the subsequent processes were repeated twice, thereby obtaining a niobium oxide-containing anode.

EXAMPLE 3

0.05 ml of a 20 mM $NbCl_5$ solution prepared by dissolving $NbCl_5$ with ethanol was applied to a surface of an anode plate that was prepared according to Comparative Example 1. The resultant anode plate was treated with ultraviolet (UV) light for 1 minute. Then, the treated anode plate was dried at 120° C. for 2 hours to remove moisture which had been absorbed during the UV treatment process. The application of the $NbCl_5$ solution and the subsequent processes were repeated four more times, thereby obtaining a niobium oxide-containing anode.

EXAMPLE 4

0.05 ml of a 20 mM $Nb(OEt)_5$ solution prepared by dissolving $Nb(OEt)_5$ with ethanol was applied to a surface of an anode plate prepared according to Comparative Example 1. The resultant anode plate was treated with ultraviolet (UV) light for 1 minute. Then, the treated anode plate was dried at 120° C. for 2 hours to remove moisture absorbed during the UV treatment process, thereby obtaining a niobium oxide-containing anode.

EXPERIMENTAL EXAMPLE 2016-type coin cell batteries were manufactured using each of the anode plates prepared according to Comparative Examples 1 to 3 and Examples 1 to 4. The batteries further included a metallic lithium electrode acting as a counter electrode, a PTFE separator, and an electrolyte prepared by dissolving 1.3 M $LiPF_6$ with a solvent mixture of ethylene carbonate (EC) and diethyl carbonate (DEC) in a volume ratio of 7:3.

Each of the manufactured coin cells was discharged with a constant current of 0.2 D until the voltage reached 1V with respect to the metallic lithium electrode. When the discharging was complete, the coin cell was left to sit for about 10 minutes. Then, the coin cell was charged with a constant current of 0.2 C until the voltage reached 2 V.

Then, charging and discharging processes were performed under conditions of 0.2 C/0.2 D, 0.5 C/0.2 D, 0.5 C/0.5 D, 0.5 C/1 D, and 0.5 C/6 D. The charging and discharging processes in each condition was performed twice. The decrease in a discharge capacity (2 C→6 C) between a discharge capacity in a condition of 0.5 C/0.2 D and a discharge capacity in a condition of 0.5 C/6 D was measured.

The results are shown in Tables 1 and 2.

TABLE 1

| | | Comparative Example 1 | Example 2 |
|---|---|---|---|
| Line resistance (Ω/1.2 cm) | | 250 | 180 |
| 0.5 C/0.2 D Discharge capacity (mAh/g) | | 133 | 147 |
| A decrease in discharge capacity with respect to discharge capacity with 0.5 C/0.2 D (%) | 0.5 C/0.5 D | 36 | 14 |
| | 0.5 C/1 D | 62 | 43 |
| | 0.5 C/6 D | 97 | 90 |

It can be seen from Table 1 that the line resistance is reduced when niobium oxide is used to improve conductivity of the anode plate. Moreover, the coin cell including the anode plate prepared according to Comparative Example 1 had a larger decrease in the discharge capacity than the coin cell including the niobium oxide-containing anode prepared according to Example 2.

TABLE 2

|  | Comparative Example 1 | Example 1 | Example 2 |
|---|---|---|---|
| the number of surface treatment process | — | one | three |
| 0.5 C/0.2 D discharge capacity (mAh/g) | 133 | 153 | 147 |

It can be seen in Table 2 that the initial discharge capacity was increased in batteries having a niobium oxide-containing anode.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode comprising:
   a collector;
   active material particles formed on the collector, the active material particles comprising:
      an active material,
      a conducting agent that is coated on a part of a surface of the active material, and
      a binder; and
   niobium oxide formed on at least some of the active material particles to at least partially surround at least some of the active material particles,
      wherein the niobium oxide is in contact with an other part of the surface of the active material on which the conducting agent is not coated.

2. The electrode of claim 1, wherein the niobium oxide is represented by $NbO_y$, where $1 \leq y \leq 2.5$.

3. The electrode of claim 1, wherein the other part of the surface of the active material is surface-treated with niobium oxide.

4. The electrode of claim 1, wherein the amount of niobium oxide is in a range of 0.01 to 5% by weight based on 100% by weight of the active material.

5. The electrode of claim 1, wherein the active material comprises at least one material selected from the group consisting of a lithium-containing metal oxide, metallic lithium, a lithium alloy, a carbonaceous material, and graphite.

6. The electrode of claim 1, wherein the active material is $Li_4Ti_5O_{12}$, $LiMPO_4$, where M denotes Fe or Mn, or $LiMn_2O_4$.

7. The electrode of claim 1, wherein the conducting agent is carbon black.

8. The electrode of claim 1, wherein the binder comprises at least one material selected from the group consisting of a vinylidenefluoride/hexafluoropropylene copolymer, polyvinylidenefluoride, polyacrylonitrile, polymethylmethacrylate, polytetrafluoroethylene, a mixture thereof, and a styrene butadiene rubber-based polymer.

9. A lithium battery comprising:
   a cathode;
   an anode; and
   an organic electrolyte, wherein
      at least one of the cathode or the anode is the electrode of claim 1.

10. The lithium battery of claim 9, wherein the organic electrolyte comprises a lithium salt and a non-aqueous organic solvent.

11. The lithium battery of claim 10, wherein the non-aqueous organic solvent is a solvent mixture of a solvent having a high dielectric constant and a solvent having a low boiling point.

* * * * *